(12) United States Patent
Galley et al.

(10) Patent No.: US 8,742,936 B2
(45) Date of Patent: Jun. 3, 2014

(54) METHOD AND CONTROL DEVICE FOR RECOGNISING INATTENTIVENESS ACCORDING TO AT LEAST ONE PARAMETER WHICH IS SPECIFIC TO A DRIVER

(75) Inventors: Lars Galley, Dettenhausen (DE); Elisabeth Hendrika Hentschel, Magstadt (DE); Klaus-Peter Kuhn, Pluederhausen (DE); Wolfgang Stolzmann, Dissen (DE)

(73) Assignee: Daimler AG, Stuttgart (DE)

( * ) Notice: Subject to any disclaimer, the term of this patent is extended or adjusted under 35 U.S.C. 154(b) by 467 days.

(21) Appl. No.: 11/916,893

(22) PCT Filed: Jun. 1, 2006

(86) PCT No.: PCT/EP2006/005214
§ 371 (c)(1),
(2), (4) Date: Jul. 18, 2008

(87) PCT Pub. No.: WO2006/131256
PCT Pub. Date: Dec. 14, 2006

(65) Prior Publication Data
US 2009/0160631 A1 Jun. 25, 2009

(30) Foreign Application Priority Data
Jun. 9, 2005 (DE) .......... 10 2005 026 479

(51) Int. Cl.
*G08B 23/00* (2006.01)
(52) U.S. Cl.
USPC ........ 340/576; 340/439; 340/575; 340/573.1; 701/41
(58) Field of Classification Search
USPC ........... 340/439, 575, 576, 425.5, 436, 573.1; 600/300; 701/1, 41; 45/301, 213, 117
See application file for complete search history.

(56) References Cited

U.S. PATENT DOCUMENTS 3,631,446 A * 12/1971 Setser ........................ 180/272
4,058,796 A * 11/1977 Oishi et al. ................. 340/459

(Continued)

FOREIGN PATENT DOCUMENTS

| DE | 102 38 324 A1 | 4/2004 |
| DE | 103 55 221 A1 | 6/2005 |

(Continued)

OTHER PUBLICATIONS

International Search Report dated Aug. 23, 2006 including English translation of the relevant portion (Sixteen (16) pages).

(Continued)

*Primary Examiner* — Benjamin C Lee
*Assistant Examiner* — Quang D Pham
(74) *Attorney, Agent, or Firm* — Crowell & Moring LLP (57) ABSTRACT

A method and a control unit are provided for detecting when the driver of a motor vehicle becomes inattentive. In order to be able to reliably draw conclusions about the presence of inattentiveness of the driver, it is proposed to observe not only a steering inactivity phase but also a steering action which follows the steering inactivity phase. A detected implementation of the steering inactivity phase and of the steering action are logically combined with one another, and the result of this logic combination is then used as a measure of the severity of the inattentiveness of the driver. In addition, the measure of the severity of the inattentiveness of the driver depends on at least one driver-specific parameter which is determined during the execution of the method. The inattentiveness of the driver can also be detected during the time interval in which the at least one driver-specific parameter is determined.

6 Claims, 5 Drawing Sheets

(56) References Cited

U.S. PATENT DOCUMENTS

| | | | |
|---|---|---|---|
| 4,088,125 A * | 5/1978 | Forgione et al. | 600/547 |
| 4,450,438 A * | 5/1984 | Seko et al. | 340/576 |
| 4,463,347 A * | 7/1984 | Seko et al. | 340/576 |
| 4,496,938 A * | 1/1985 | Seko et al. | 340/576 |
| 4,509,040 A * | 4/1985 | Seko et al. | 340/576 |
| 4,581,607 A * | 4/1986 | Seko et al. | 340/576 |
| 4,594,583 A * | 6/1986 | Seko et al. | 340/576 |
| 4,604,611 A * | 8/1986 | Seko et al. | 340/576 |
| 4,611,199 A * | 9/1986 | Seko et al. | 340/576 |
| 4,794,536 A * | 12/1988 | Eto et al. | 701/41 |
| 4,928,090 A * | 5/1990 | Yoshimi et al. | 340/575 |
| 5,311,877 A * | 5/1994 | Kishi | 600/545 |
| 5,488,353 A * | 1/1996 | Kawakami et al. | 340/576 |
| 5,573,006 A * | 11/1996 | Shimotani et al. | 600/558 |
| 5,574,641 A * | 11/1996 | Kawakami et al. | 701/1 |
| 5,595,488 A * | 1/1997 | Gozlan et al. | 434/236 |
| 5,642,093 A * | 6/1997 | Kinoshita et al. | 340/439 |
| 5,715,070 A * | 2/1998 | Tone et al. | 358/468 |
| 5,717,606 A * | 2/1998 | Hara et al. | 701/44 |
| 5,745,031 A * | 4/1998 | Yamamoto | 340/439 |
| 5,769,085 A * | 6/1998 | Kawakami et al. | 600/519 |
| 5,906,208 A * | 5/1999 | Ishikawa et al. | 128/898 |
| 6,024,575 A * | 2/2000 | Ulrich | 434/236 |
| 6,061,610 A * | 5/2000 | Boer | 701/1 |
| 6,172,610 B1 * | 1/2001 | Prus | 340/575 |
| 6,198,397 B1 * | 3/2001 | Angert et al. | 340/576 |
| 6,353,396 B1 * | 3/2002 | Atlas | 340/693.9 |
| 6,356,812 B1 * | 3/2002 | Cragun | 701/1 |
| 6,356,833 B2 * | 3/2002 | Jeon | 701/93 |
| 6,405,132 B1 * | 6/2002 | Breed et al. | 701/301 |
| 6,554,092 B2 * | 4/2003 | Midorikawa et al. | 180/268 |
| 6,642,846 B1 * | 11/2003 | Krubiner et al. | 340/545.3 |
| 6,661,345 B1 * | 12/2003 | Bevan et al. | 340/575 |
| 6,756,903 B2 * | 6/2004 | Omry et al. | 340/576 |
| 6,768,962 B2 * | 7/2004 | Bullinger et al. | 702/139 |
| 6,870,470 B2 * | 3/2005 | Nomura et al. | 340/441 |
| 6,950,027 B2 * | 9/2005 | Banas | 340/576 |
| 6,974,326 B2 * | 12/2005 | Marple-Horvat | 434/236 |
| 7,072,753 B2 * | 7/2006 | Eberle et al. | 701/45 |
| 7,084,773 B2 * | 8/2006 | Oyama | 340/575 |
| 7,088,250 B2 * | 8/2006 | Yasushi | 340/573.1 |
| 7,248,997 B2 * | 7/2007 | Nagai et al. | 702/182 |
| 7,266,436 B2 * | 9/2007 | Shirato et al. | 701/70 |
| 7,283,056 B2 * | 10/2007 | Bukman et al. | 340/575 |
| 7,427,924 B2 * | 9/2008 | Ferrone et al. | 340/576 |
| 7,455,146 B2 * | 11/2008 | Brosig et al. | 180/272 |
| 7,551,093 B2 * | 6/2009 | Maass | 340/576 |
| 7,639,148 B2 * | 12/2009 | Victor | 340/576 |
| 7,663,495 B2 * | 2/2010 | Haque et al. | 340/576 |
| 2002/0030357 A1 * | 3/2002 | Midorikawa et al. | 280/806 |
| 2002/0097160 A1 * | 7/2002 | Oyama | 340/576 |
| 2003/0110860 A1 * | 6/2003 | Okada | 73/593 |
| 2003/0153846 A1 * | 8/2003 | Marple-Horvat | 600/587 |
| 2004/0044293 A1 * | 3/2004 | Burton | 600/544 |
| 2004/0088095 A1 * | 5/2004 | Eberle et al. | 701/45 |
| 2004/0113800 A1 * | 6/2004 | Benedict | 340/576 |
| 2004/0201481 A1 * | 10/2004 | Yoshinori et al. | 340/575 |
| 2005/0021204 A1 * | 1/2005 | Kudo | 701/36 |
| 2005/0046579 A1 * | 3/2005 | Oyama | 340/575 |
| 2005/0128092 A1 * | 6/2005 | Bukman et al. | 340/576 |
| 2005/0159853 A1 * | 7/2005 | Takahashi et al. | 701/1 |
| 2005/0231342 A1 * | 10/2005 | Kim | 340/438 |
| 2008/0024284 A1 * | 1/2008 | Baratoff et al. | 340/435 |
| 2009/0021356 A1 | 1/2009 | Galley et al. | |
| 2009/0115589 A1 * | 5/2009 | Galley et al. | 340/439 |
| 2009/0132109 A1 * | 5/2009 | Galley et al. | 701/29 |

FOREIGN PATENT DOCUMENTS

| | | |
|---|---|---|
| JP | 60-12341 A | 1/1985 |
| JP | 7-93678 A | 4/1995 |
| JP | 9-123790 A | 5/1997 |
| JP | 2005-158077 A | 6/2005 |

OTHER PUBLICATIONS

German Office Action dated Dec. 8, 2006 including English translation of the relevant portion (Five (5) pages).

Decision to Grant a Patent dated Aug. 7, 2012 with partial English translation (four (4) pages).

* cited by examiner

METHOD AND CONTROL DEVICE FOR RECOGNISING INATTENTIVENESS ACCORDING TO AT LEAST ONE PARAMETER WHICH IS SPECIFIC TO A DRIVER

BACKGROUND AND SUMMARY OF THE INVENTION

This invention relates to a method for detecting when the driver of a motor vehicle becomes inattentive. Furthermore, the invention relates to a control unit for detecting inattentiveness of the driver of a vehicle.

Japanese document JP 09 123 790 A discloses a method in which the driver's state is monitored by comparing the distribution of the steering speed and the frequency of steering movement with set reference values. The reference values are required at the start of a journey.

Japanese document JP 07 093 678 A discloses a method for detecting tiredness of the driver of a vehicle, in which method a steering inactivity phase and a subsequent steering action are detected.

Taking this prior art as a basis, the object of the invention is to make available a method and a control unit for carrying out this method which permit more reliable detection of possible inattentiveness of the driver.

This object is achieved by means of the features of the invention claimed.

In the claimed method, a steering inactivity phase and a subsequent steering action are detected. The magnitude of the implementation of the steering action is determined by evaluating the change in the steering wheel angle over time. A measure of the severity of the inattentiveness of the driver as he steers the vehicle is acquired by evaluating the result of a logic combination of the implementation of the steering inactivity phase and the implementation of the steering action.

When detecting inattentiveness of the driver, the invention advantageously differentiates between the steering inactivity phase and a more or less violent steering action which typically follows when a state of inattentiveness is present. A state of inattentiveness is therefore assumed if both the steering inactivity phase and the following steering action are detected in combination with one another. For the acquisition of the measure of the severity of the inattentiveness, the detected implementations of both the inactivity phase and of the steering action are logically combined with one another, and the result is then evaluated.

In modern vehicles, in particular motor vehicles, a sensor is usually present in any case for sensing the steering wheel angle x. For this reason, there is advantageously in principle no need for an additional sensor to implement the described method.

The assessment of the implementation of the steering inactivity phase, that is to say its duration, is advantageously acquired by evaluating the steering wheel angle and the implementation of the steering action by sensing the maximum gradient of the steering wheel angle which occurs.

The logic combination of the implementation of the steering inactivity phase with the implementation of the steering action in order to acquire a measure of the severity of the inattentiveness of the driver is carried out, for example, by means of a multi-dimensional operator. This logic combination is advantageously carried out only if both the steering inactivity phase and the anticipated subsequent steering action each occur with a predetermined minimum implementation. If the steering inactivity phase or the steering action are not implemented to a sufficiently high degree, it is assumed that the driver is not in a state of inattentiveness.

In one advantageous embodiment of the invention, the result of the logic combination, that is to say for example the result of the operator logic combination, can be mapped onto a probability value using a sigmoid function. In this way it is possible to specify the probability, between 0% and 100%, that the driver was inattentive at a specific time when he was steering the vehicle.

In order to increase the reliability of a conclusion about the attentiveness or inattentiveness of the driver of the vehicle, it is recommended not only to evaluate a result of the logic combination but instead to support this conclusion on a plurality of such logic combination results. In this context it is possible to draw a conclusion about the inattentiveness of the driver more reliably, since each result which results from a logic combination is weighted with an assigned weighting factor in order then ultimately to acquire an averaged logic combination result from the available plurality of weighted logic combination results by mathematically forming mean values. This averaged logic combination result then represents, compared to a nonaveraged logic combination result, a more reliable measure of the severity of the inattentiveness of the driver at a specific time when he is steering the vehicle.

Finally, it is advantageous if, in particular, the driver of the vehicle is informed about the detected inattentiveness in the form of a visual or acoustic warning message.

The inattentiveness of the driver advantageously is determined as a function of at least one driver-specific parameter. This driver-specific parameter is determined within a time interval Ti during the journey. It is advantageous here that the inattentiveness can also be determined during the time interval Ti during which the at least one driver-specific parameter is being determined. It is thus possible, if appropriate, also to warn the driver during the time interval Ti.

It is particularly advantageous for the at least one driver-specific parameter to be determined during a plurality of time intervals Ti. A first time interval Ti can lie, for example, at the start of the journey. It is then possible to determine the at least one driver-specific parameter during continuous subsequent time intervals Ti. This permits the driver-specific parameter to be correspondingly adjusted continuously. Likewise it is possible to determine the at least one driver-specific parameter only during specific time intervals Ti which do not follow one another.

In one advantageous embodiment of the invention, the at least one driver-specific parameter relates to a measure of the inattentiveness at which the information is output to the driver of the vehicle. As a result the so-called triggering threshold, starting from which a warning is issued to the driver, is set on a driver-specific basis and as a function of the instantaneous state of the driver.

As a result, the detection reliability of driver-specific properties is advantageously improved significantly. The adaptation is no longer restricted to the starting phase; rather, changes over relatively long distances are also taken into account. This is important in the case of inattentiveness, and in particular in the case of the detection of tiredness, since these factors are to be considered particularly critical on long journeys.

Further advantageous refinements of the method are also claimed.

The abovementioned object of the invention is also achieved by means of a control unit for carrying out the described method. The advantages of the solution correspond to the advantages mentioned above with respect to the described method.

DETAILED DESCRIPTION OF THE INVENTION

Figure 1:
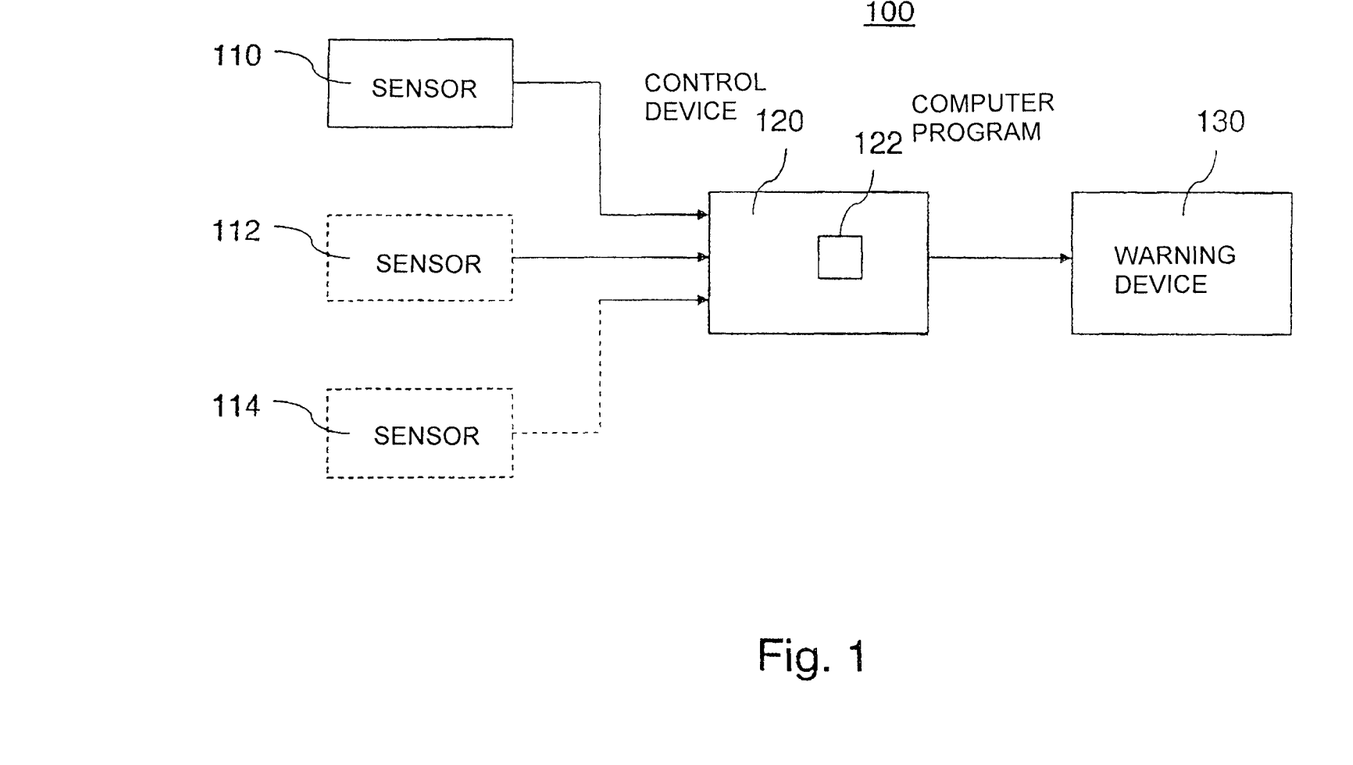
FIG. 1 shows a control unit according to the invention.

FIG. 1 shows a control unit 100 for carrying out the inventive method for detecting inattentiveness of the driver of a vehicle, in particular of a motor vehicle. The control unit is mounted in the vehicle and comprises a steering wheel angle sensor 110 for sensing the current steering wheel angle x, that is to say the steering movement caused by the driver. Furthermore, the control unit 100 comprises a control device 120 which is preferably embodied as a microcontroller. The control device 120 senses a sensor signal which is generated by the steering wheel angle sensor 110 and which represents the steering wheel angle x.

The steering wheel angle x represents a first and preferred indicator of inattentiveness of the driver. In addition to the steering wheel angle, the control device 120 can basically also receive and evaluate further sensor signals from other sensors 112, 114 as further indicators of the inattentiveness of the driver.

In order to detect inattentiveness of the driver, a computer program 122 runs on the control device 120. This computer program 122 detects the inattentiveness, in accordance with an inventive method which is described below, by evaluating the steering wheel angle x as an indicator. If inattentiveness of the driver is detected, it is advantageous if the control device 120 actuates a warning device 130 so that the latter outputs an acoustic or visual warning message to the driver. Owing to the warning message, the driver's attention is drawn to his inattentive behavior as he is driving the vehicle and he is given an opportunity to become attentive again.

Figure 2:
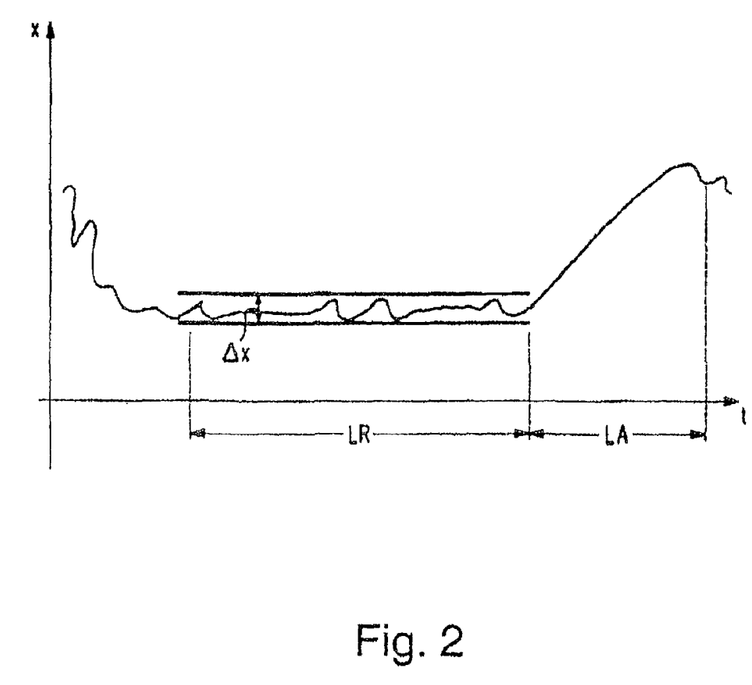
FIG. 2 shows an example of the profile of the steering angle x when inattentiveness of the driver is present according to the invention.

FIG. 2 shows a typical profile of the steering wheel angle in the form in which it is present when inattentiveness of the driver is detected using the present invention. This profile is typical of the presence of inattentiveness of the driver insofar as it initially has a steering inactivity phase LR in which it does not change substantially. In FIG. 2, the steering angle remains during the steering inactivity phase LR in the deflection range $\Delta$x which is bounded by the two parallel horizontal lines. A very strong or violent steering reaction LA which follows this steering inactivity phase LR is then characteristic of the presence of inattentiveness in the sense of the invention. This violent steering action LA is represented in FIG. 2 by the steep rise in the steering angle x at the end of the inactivity phase.

Figure 3:
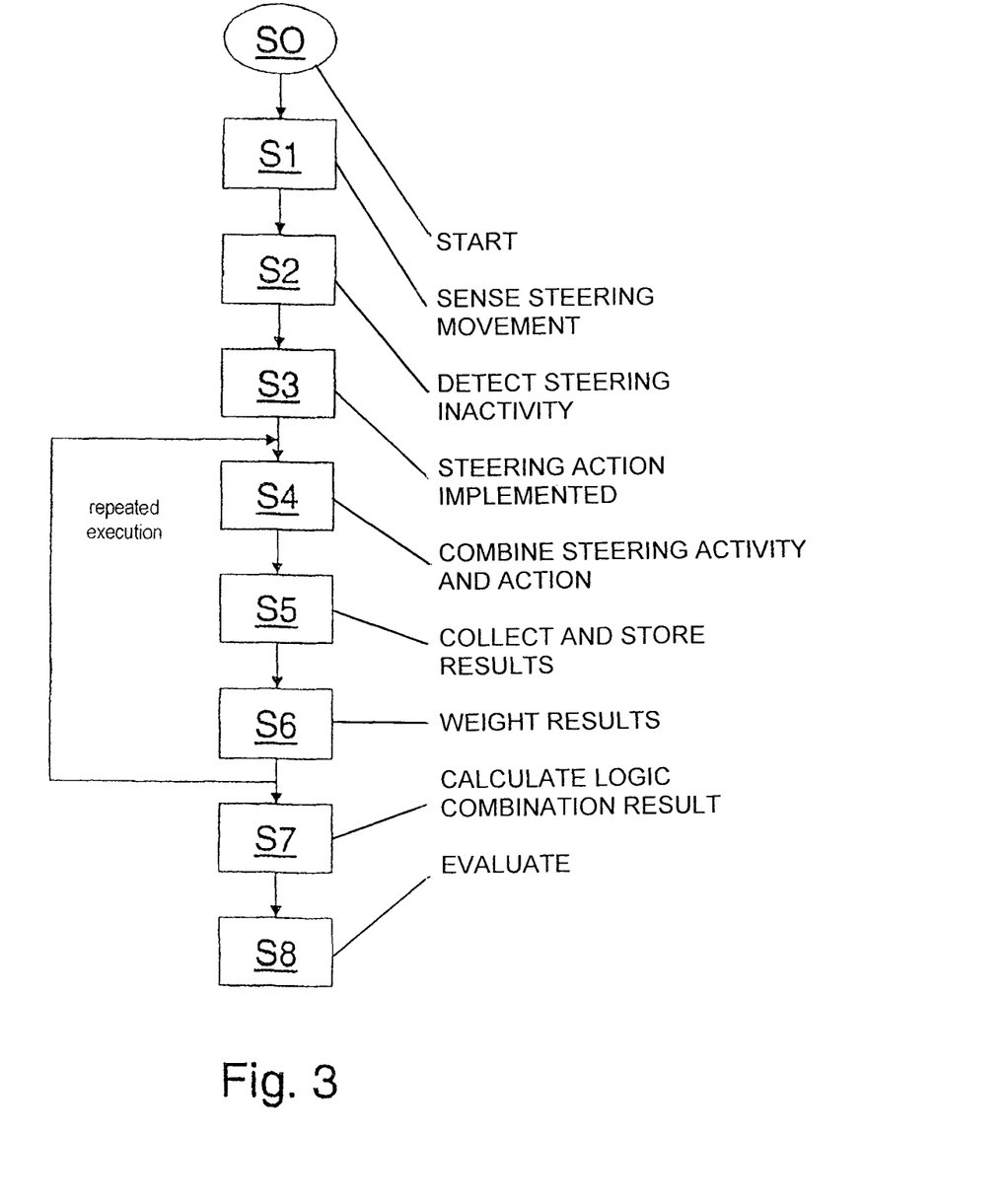
FIG. 3 shows the profile of the method for detecting inattentiveness of the driver.

FIG. 3 illustrates the inventive method which is implemented using the control unit 100 which is described above. The flowchart of FIG. 3 shows nine method steps S0 to S8 of the method.

After a starting step S0, the method of FIG. 3 firstly provides for the sensing of a steering movement of the steering wheel of the vehicle, that is to say the sensing of the steering behavior of the driver in the form of the steering wheel angle x (method step S1). On the basis of the sensed steering wheel angle x, the detection of the steering inactivity phase LR 4, cf. FIG. 2, then takes place in a second step S2. The implementation of the steering inactivity phase means, in particular, its duration. A steering inactivity phase occurs for as long as the steering angle of the vehicle is within the predefined angle interval $\Delta$x, cf. FIG. 2. The duration of this situation then represents the implementation of the steering inactivity phase LR.

The implementation of a steering action which follows the detected steering inactivity phase is then detected in a method step S3. For this purpose, the maximum gradient of the steering angle which then occurs is acquired. In FIG. 2, this gradient is in the form of positive gradient of the steering angle illustrated in the form in which it occurs after the steering wheel angle has left the angle interval $\Delta$x. In the method step S4, the implementation of the steering inactivity phase and of the steering action are then logically combined with one another. This is done, for example, by means of a multi-dimensional operator. The multi-dimensional operator may be a characteristic diagram, a weighting function or a logic decision function. The result of this application of this multi-dimensional operator then represents a suitable measure of the severity of the inattentiveness of the driver when he is steering the vehicle. The logic combination of the two aforesaid implementations is, however, advantageously carried out only if it has become apparent in the previously carried-out steps S2 and S3 that the implementation of the steering inactivity phase in the form of its duration is longer than a predetermined minimum duration, and the maximum gradient of the steering wheel angle exceeds a predetermined gradient threshold value. Otherwise, the implementations of the steering inactivity phase and of the steering action are not considered by the method to be sufficiently strongly enough implemented in order to be able to conclude that the driver is inattentive on the basis of the combined presence of the implementations mentioned.

One possible way of further processing the logic combination result which is acquired in the method step is then, for example, to standardize it using a Sigmoid function.

Alternatively or additionally it is possible, in a further exemplary embodiment, to calculate the logic combination result, in the form in which it has occurred in step 4, repeatedly during a predetermined measuring time interval. The repeated execution of the calculation of the logic combination results at various times during the measuring time interval leads to a situation in which preferably a plurality of logic combination results are present at the end of the measuring time interval. These logic combination results can be tapped in a standardized form. Alternatively or additionally, it is also possible, in method step S5, immediately to collect and store directly the logic combination results acquired in the method step S4. In method step S6, these logic combination results are then weighted individually by assigning a weighting factor to each of these results. These weighting factors represent the respective driving situation of the vehicle or the current deflection of the driver in each case at the time to which the logic combination result refers.

In method step S7, a weighted logic combination result is then finally calculated by mathematical, preferably arithmetic, weighted formation of mean values, of the logic combination results acquired during the measuring time interval, taking into account their assigned weighting factors.

The averaged result of the logic combination is then preferably subjected to a fault criterion in method step S8 and evaluated in order to generate a warning signal to the driver. The fault criterion is met if the sum of all the logic combination results calculated in the last N minutes, each weighted with their specific weighting factors, exceeds a predefined threshold value. This threshold value corresponds to a triggering threshold for warning the driver.

The triggering threshold is preferably determined as the driver-specific parameters. The determination is carried out here during a time interval Ti. One of the time intervals Ti preferably lies at the start of a journey.

Figure 4:
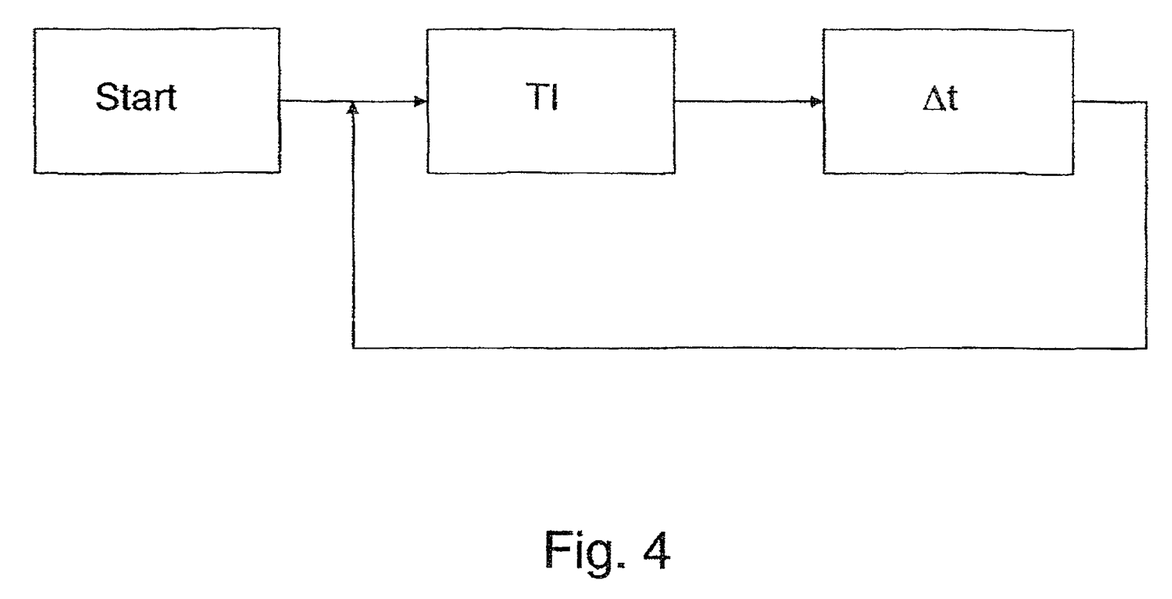
FIG. 4 is a flowchart showing the passage through the intervals Ti.

FIG. 4 illustrates by way of example the passage through a plurality of time intervals Ti in order to determine a driver-specific triggering threshold. Starting from a starting step, the at least one driver-specific parameter, for example the triggering threshold, is determined during a time period Ti. This is followed by a time interval ΔT during which the triggering threshold is not determined. After this, the driver-specific parameter is determined repeatedly during further time intervals Ti. In a further embodiment of the invention, the time interval ΔT=0 so that the driver-specific parameter is determined continuously, or the time interval ΔT<0 may be true so that overlapping intervals are produced. It is also possible for ΔT to assume different values over the duration of the method, that is to say for example over the duration of a journey. These values can be 0 or else >0.

According to the invention, the method can already detect inattentiveness of the driver when the time interval Ti is first passed through, that is to say while the driver-specific parameter is being determined for the first time. This is achieved in that limits, on whose upper transgression the system can already respond in the startup phase, are predefined for the driver-specific parameter as a starting value. In the present example, limits which respond when the driver-specific parameter is determined for the first time are predetermined for the triggering threshold. A warning can already be issued in the first identification phase. Likewise, a warning can also be issued in all the further identification phases Ti.

For example, this can be done for an inattentiveness value $U_w(Ti)$ in the identification phase Ti by means of the following procedure. $U_w(Ti)$ is detected here as a function of the steering inactivity phases and steering corrections in Ti. Inattentiveness is detected in this example if the triggering threshold is exceeded, i.e. if the following applies:

$$U_w(T_{i+1}) > \min(S_o, \max(S_u, f \cdot \min(U_w(t))))$$

In the example this means that, independently of the driver, information is provided or a warning is issued if $S_o$ is exceeded, which is already possible in the first identification phase. If $S_u$ is undershot, information is not provided and no warning is issued. Within the thresholds $S_o$ and $S_u$, the minimum inattentiveness value has to be exceeded by a factor $f$ in order to trigger information or a warning. In this context, the formation of a minimum value has the effect, in this example, that inattentiveness at the start of a journey, during which the inattentiveness value does not assume minimum values, is no longer significant in the further course of the procedure.

Driver-specific parameters which are acquired in the starting phase can lose their informative potential over time, for example during a continuing journey. For this reason is it advantageous to repeat the determination of the driver-specific parameter in the course of the journey.

In the course of a journey it is possible to detect typical patterns.

1. At the start of a journey there is a certain phase of accustomization to the vehicle and to the driving process. This is characterized, for example, by a less steady driving behavior, by changing of the sitting position, by the adjustment of settings on the vehicle. These procedures ultimately also affect the steering pattern.

2. During the journey there are also creeping changes in the steering pattern. This has to do with the optimization of the resources which the driver uses for the driving task. That is to say as the driver becomes increasingly accustomed to the vehicle and to the driving process, the resources which he has to apply to the driving task progressively decrease. In this phase, there is, for example, also no tiredness present.

3. After interruptions in the journey, similar patterns to those at the start of the journey occur.

Determination of the driver-specific parameter which is determined exclusively at the start of the journey cannot account for these changes in the driving behavior which are expressed by changes in the steering pattern. If the at least one driver-specific parameter is correspondingly adjusted over the journey, it is possible to compensate for these effects. As a result, the systematic lack of precision of a driver-specific parameter which is defined only at the start of the journey is compensated for. Advantageously, for the at least one driver-specific parameter, limits are predefined, beyond which that parameter cannot be adapted. Likewise, the speed of the adaptation of the driver-specific parameter is adapted in such a way that reliable detection of inattentiveness always remains possible.

Figure 5:
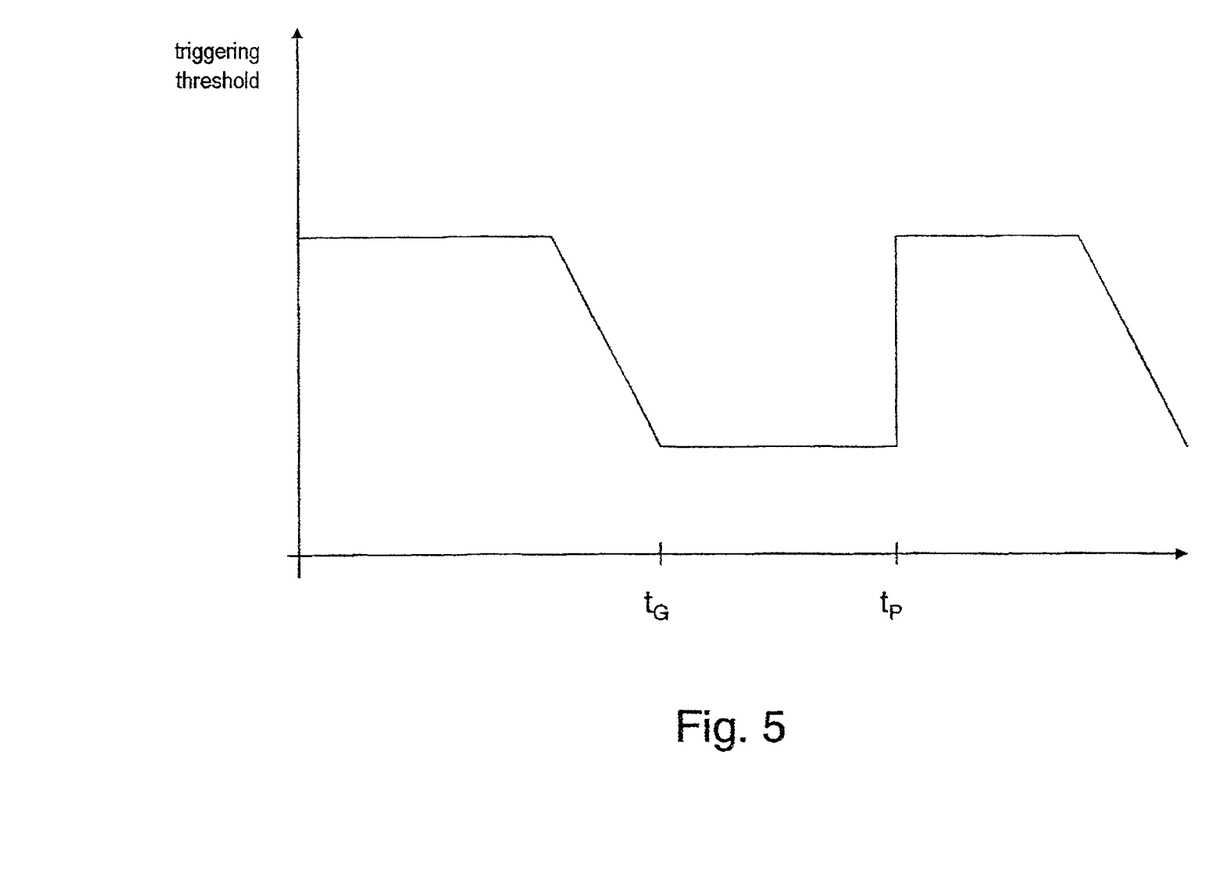
FIG. 5 shows the profile of a triggering threshold in the course of a journey by way of example.

FIG. 5 shows, for example, the profile of a driver-specific parameter, in the present case of the triggering threshold for the warning. At the start of the journey at the time T=0, the triggering threshold is at a relatively high value, which corresponds to the starting value of the parameter of the triggering threshold. As the duration of driving increases, the triggering threshold slowly decreases. This corresponds to the phase of accustomization to the vehicle and to the driving process by the driver. Starting from a time Tg, the driver has become accustomed to the driving process and to the vehicle so that here a relatively low triggering threshold is sufficient. FIG. 5 illustrates further the effect of an interruption in the journey on the triggering threshold. At the time Tp, there is a following interruption in the journey. The triggering threshold is reset again to a high value from the start in order to allow for the driving patterns after an interruption in a journey which are similar to those at the start of a journey. This is followed by a reduction in the triggering threshold as the duration of driving increases.

Advantageously, at the start of a journey the interval Ti is run through repeatedly in immediate succession until the typical starting patterns have faded away. In this phase, the reduction in the detection thresholds can then be observed. As a result there is then facilitated detection of inattentiveness through increasing error rates. Lower limits are to be complied with as adaptation limits so that the method does not become excessively sensitive as a result of excessively low thresholds.

During the determination of the at least one driver-specific parameter, the time windows Ti are run through repeatedly in long sections of the journey, in which case time periods ΔT without determination of the at least one driver-specific parameter may occur between the intervals Ti. The speed of change of the triggering threshold, that is to say the adaptation speed, is limited in such a way that as the driver becomes increasingly tired or inattentive it remains possible to detect the tiredness or inattentiveness. The triggering threshold therefore does not increase more quickly than the inattentiveness of the driver which is to be detected.

The resumption after short breaks in driving, for example at the time Tp, is treated approximately as a start of a journey. A difference is, for example, that it is possible to move again earlier into the phase 2 in which the driver has become accustomed to the driving process and the vehicle. Short breaks in driving can be determined, for example, in terms of their length by means of a small temperature model which takes into account the temperature of the engine and the external temperature.

The driver-specific determination of one or more parameters in order to determine the inattentiveness of a driver during a specific time interval can also be used for other facets of inattentiveness, for example for assessing the behavior of a driver with regard to risk or for assessing his driving style.

The invention claimed is:

1. A method for detecting when a driver of a vehicle becomes inattentive by sensing steering wheel angle signals generated by a steering wheel angle sensor of the vehicle, comprising:

determining a driver-specific warning triggering threshold, sensing a start of a steering inactivity phase in which the steering wheel angle is deflected within a predetermined deflection range, sensing an end of the steering inactivity phase when the steering wheel angle is outside of a predefined deflection angle, and determining a steering inactivity phase duration, determining a characteristic of a steering action acquired by the end of the steering inactivity phase, logically combining the steering inactivity phase duration and the characteristic of the steering action acquired at the end of the steering inactivity phase only when the steering inactivity phase duration is longer than a predetermined minimum duration and the characteristic of the steering action exceeds a predetermined threshold to provide a logic combination result, determining driver inattentiveness to exist when the logic combination result exceeds said driver-specific warning triggering threshold, repeating the above sensing steps, the determining a steering inactivity phase duration step, the determining a characteristic step, the logically combining step, and the determining driver inattentiveness step, collecting and storing a plurality of the logic combination results, and assigning a weighting factor to each logic combination result to provide weighted logic combination results, wherein the assigned weighting factor represents a respective driving situation of the vehicle or a current deflection of the driver in each case at a time to which each logic combination result refers, determining a final logic combination result from the weighted logic combination results to update said driver-specific warning triggering threshold, determining driver inattentiveness to exist when the final logic combination result exceeds said updated driver-specific warning triggering threshold, and outputting a warning message to the driver when driver inattentiveness is determined to exist.

2. The method of claim 1, wherein the characteristic of the steering action is a gradient of the steering wheel angle.

3. The method of claim 1, wherein the start of the steering inactivity phase is determined by movement of a steering wheel.

4. The method of claim 1, wherein the final logic combination result is determined from mean values of the weighted logic combination results.

5. The method of claim 1, wherein the warning message is a visual warning message.

6. The method of claim 1, wherein the warning message is an acoustic warning message.

* * * * *